358-140. OR 3,193,619 SR SEARCH ROOM

July 6, 1965 E. SENNHENN 3,193,619
METHOD AND ARRANGEMENT FOR CONVERTING VIDEO SIGNALS
FROM ONE TO ANOTHER FRAME FREQUENCY
Filed Aug. 7, 1961 3 Sheets-Sheet 1

CONVERSION FROM 50cps TO 60cps

CONVERSION FROM 47cps TO 60cps

CONVERSION FROM 60cps TO 47cps

INVENTOR.
Emil Sennhenn
BY
Michael S. Striker
Attorney

July 6, 1965 E. SENNHENN 3,193,619

METHOD AND ARRANGEMENT FOR CONVERTING VIDEO SIGNALS FROM ONE TO ANOTHER FRAME FREQUENCY

Filed Aug. 7, 1961 3 Sheets-Sheet 2

INVENTOR.
Emil Sennhenn

BY

Michael S. Striker
Attorney

INVENTOR.
Emil Sennhenn
BY
Michael S. Striker
Attorney

United States Patent Office 3,193,619
Patented July 6, 1965

3,193,619

METHOD AND ARRANGEMENT FOR CONVERTING VIDEO SIGNALS FROM ONE TO ANOTHER FRAME FREQUENCY

Emil Sennhenn, Darmstadt-Arheilgen, Germany, assignor to Fernseh G.m.b.H., Darmstadt, Germany Filed Aug. 7, 1961, Ser. No. 130,736
Claims priority, application Germany, Aug. 6, 1960, F 31,846
16 Claims. (Cl. 178—6.8)

Figure 1A:
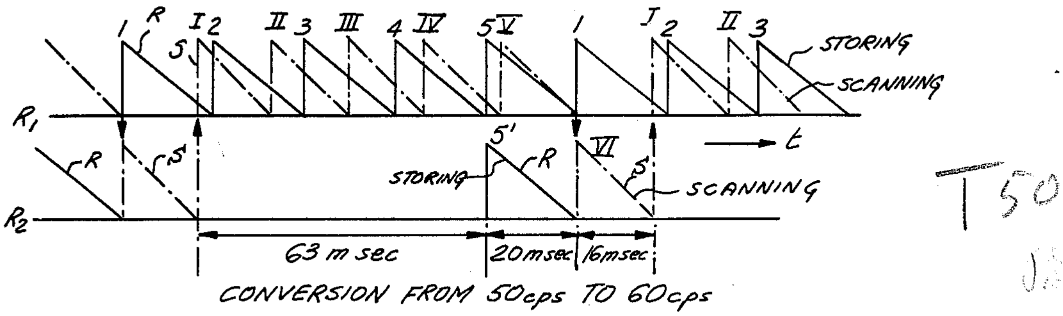

The present invention concerns a method and an arrangement for converting video signals from one to another frame frequency. Such conversion from one frame frequency to another is particularly of interest whenever a television transmission is received at a particular frame frequency in accordance with one television standard, and is to be retransmitted at another frame frequency in accordance with another television standard.

Up to now no satisfactory solution for this problem has been known. For instance, devices for changing a frame frequency have been proposed which operate with two storage tubes which have each one storage electrode and one scanning beam. In these devices the electron beam is used alternatingly for storing and for scanning, the two tubes serving alternatively for storing video signals at one frame frequency and for scanning stored video signals at another frame frequency. However, for the operation of such an arrangement it was necessary to use a complicated switching mechanism comprising four switches for the deflector or vertical sweep frequency and at least two additional switches for the frame frequencies. Moreover, it was only possible to arrive at doubling the first frame frequency. In those cases however where the second frame frequency was not an integer multiple of the first frame frequency considerable difficulties developed in the control of the various switches.

At present three systems are being used in practice for converting video signals having one standard frame frequency into video signals having another standard frame frequency: According to the first one of these systems a television picture is produced with a first frame frequency on a screen of a picture tube having an afterglow of about 1/100 second, and this picture is picked up by means of a vidicon camera operating at the desired second frame frequency. The vidicon camera has a comparatively greater storing capacity which combines with the afterglow of the picture tube screen in such a manner that brightness fluctuations resulting from the difference between the frame frequencies are smoothed out or compensated to some extent. According to a second system the incoming television signal is first recorded on some recording means, and this record is then scanned or picked up separately, if desired even after an undetermined time interval, by means of a suitable transducer operating at the desired second frame frequency. The record carrier means may be a magnetizable tape, a film or any other mechanically movable carrier. According to a third system the record carrier is constituted by the storage electrode of a two-beam picture storage tube. The video signal having the first frame frequency is stored by means of one beam, and is scanned by means of another beam at the second frame frequency, the stored signal being either simultaneously or independently cancelled. Some special types of two-beam storage tubes have been used in this connection.

The first one of the above-mentioned three known systems operates satisfactorily only when the first frame frequency is equal to the second frame frequency. As soon as differences between these frame frequencies exist, flicker effects develop which are very difficult to eliminate because the storage capacity of the vidicon tube is insufficient, but even if this storage capacity were greater, undesirable double images or so-called "ghosts" appear. The optical transmission of the picture from one device to the other causes an additional blurring or lack of clarity and consequently a loss of satisfactory modulation at higher frequencies. In the case of the second system mentioned above comprising the use of transportable magnetizable storage or recording means the desired conversions from any first frame frequency to any other frame frequency can be carried out in principle provided that the recorded picture is so strongly wobbled that the line pattern does not cause any trouble. However, when a variety of different vertical sweep or frame frequencies are to be handled, rather involved mechanical structures must be provided. If the record carriers are films then the additional step of the development of the films must be carried out. Finally, also in the known systems based on the use of a two-beam storage tube difficulties arise when different frame frequencies are to be dealt with because in the case of coincidence, or of reversal of the sequence of the two beams a picture recorded only once may be scanned or picked up twice, or vice versa. This leads to the loss of a complete picture frame or at least of parts thereof. The just-mentioned difficulty arises even with a two-beam tube with a divided raster.

The task of converting video signals having a first frame frequency into video signals having a second frame frequency comprises the following conditions to be met:

(1) The vertical sweep or frame frequency $f_1$ of the input video signal is equal to the corresponding frequency $f_2$ of the desired output video signal, while the line frequencies differ;

(2) The frame frequency $f_1$ of the input signal is coupled with the frame frequency $f_2$ of the output signal, and the frequency $f_1$ is smaller than the frequency $f_2$ (the term "coupled" concerning the frame frequencies has the meaning that from the incoming signals synchronizing signals for the outgoing television signals are derived. The term "not coupled" has the meaning that the outsoing signals are synchronized by a local oscillator);

(3) The frame frequency of the input signal is coupled with the frequency $f_2$ of the output signal, and the frequency $f_1$ is larger than the frequency $f_2$;

(4) The frame frequency $f_1$ of the input signal is not coupled with the frame frequency $f_2$ of the output signal and the frequency $f_1$ is smaller than the frequency $f_2$;

(5) The frame frequency $f_1$ of the input signal is not coupled with the frequency $f_2$ of the output signal, and the frequency $f_1$ is larger than the frequency $f_2$.

It is one object of this invention to provide for a method of converting video signals having a first frame frequency into video signals having a second frame frequency under a plurality of the above-mentioned conditions.

It is a further object of this invention to provide for an arrangement suitable to carry out the method according to the invention.

It is still another object of this invention to provide for an arrangement for the purpose set forth which is capable of carrying out the desired conversion under any one of the above-mentioned conditions.

With above objects in view the invention provides for a method of converting video signals having a first frame frequency into video signals having a second frame frequency, comprising the steps of: forming simultaneously two sequences of first stored video signals at said first frame frequency, including timely spaced stored video signals defined by occurring during those individual frame periods in which, in the event of scanning said first stored video signals at said second frame frequency, the sequence of storing and scanning would be reversed, both sequences combined including during the time intervals between any two of said timely spaced stored video signals a combined continuous inbetween sequence of said first stored video signals, only one of said sequences including said timely spaced stored video signals, while the other one of said sequences does not include said timely spaced stored video signals, but always includes one of said first stored video signals in a frame period immediately preceding the frame period of each of said timely spaced stored video signals; scanning at said second frame frequency said combined inbetween sequence of said first stored video signals between any two consecutive ones of said timely spaced video signals, and scanning in said other one of said sequences said first video signals in said frame periods immediately preceding the frame periods of said timely spaced stored video signals, while at the same time omitting the scanning of said timely spaced stored video signals; and combining all the obtained scanned video signals for delivering a sequence of video output signals at said second frame frequency.

In another aspect of the invention there is provided in an arrangement for converting video signals having a first frame frequency into video signals having a second frame frequency, in combination, first and second storing means for storing sequences of video signals; operating means for forming in said storing means simultaneously two sequences of first stored video signals at said first frame frequency, including timely spaced stored video signals defined by occurring during those individual frame periods in which, in the event of scanning said first stored video signals at said second frame frequency, the sequence of storing and scanning would be reversed, and for forming in both said storing means combined a combined continuous inbetween sequence of said first video signals during the time intervals between any two of said timely spaced stored video signals, and for forming only in said first storing means said timely spaced stored video signals, while forming in said second storing means one of said first stored video signals in a frame period immediately preceding the frame period of each of said timely spaced stored video signals; scanning means for scanning in said storing means at said second frame frequency said combined inbetween sequence of said first video signals between any two consecutive ones of said timely spaced video signals, and for scanning in said second storing means said first video signals in said frame periods immediately preceding the frame periods of said timely spaced stored video signals, while at the same time omitting the scanning of said timely spaced stored video signals in said first storing means; and common video signal output means connected with said scanning means for delivering a sequence of video signals at said second frame frequency.

A preferred arrangement according to the invention for converting video signals having a first frame frequency into video signals having a second frame frequency, comprises in combination, a first and a second two-beam storage tube means, each having a video signal storing beam system producing a storing beam, and a scanning beam system producing a scanning beam; operating means for operating said storing beam system of said first tube means at a first frame frequency and for operating said scanning system of said first tube means at a second frame frequency, said operating means causing, when the condition arises that during continuous storing and scanning in said first tube means the relative sequence of said storing and scanning beams would be reversed during a particular frame period, in said second tube means the production of a storing beam for storing in said second tube means, for one frame period immediately preceding said particular frame period, an additional video signal identical and simultaneous with the corresponding video signal being stored in said first tube means; means for activating said scanning beam system in said second tube means for scanning, within the duration of said particular frame period, said additional video signal stored in said second tube means, and for simultaneously cutting off said scanning beam in said first tube means during said particular frame period; and common video signal output means connected with said scanning beam systems of both said first and second tube means for delivering a sequence of video signals at said second frame frequency.

Preferably the above-mentioned two-beam storage tube means are of the well known orthicon type; i.e. the charges on the target are generated by a writing electron beam instead of a projected electron optical image.

The remarkable advantage of the invention resides in the fact that losses of video signals or frames and disturbances due to reversal of the sequence of storing and scanning beams are avoided no matter which one of the above mentioned prevailing conditions for the conversion of frame frequencies may prevail. The only transitory or intermittent activation of the second tube system for the purpose of storing or scanning entails the advantage that it is not critical whether the scanning pattern of the first system coincides exactly with that of the second system because geometrical discrepancies are hardly noticeable in view of the brief temporary activation of the second system. If desired, the frequency band of the second tube may be limited in order to avoid double images.

The arrangement according to the invention can be used under all conversion conditions as stated above. Essentially its function is such that if video signals are stored in the first tube at a frame frequency of 50 c.p.s. and the scanning is to be done at the desired output frame frequency of 60 c.p.s., then every sixth scanning operation of the first tube is blocked while simultaneously the scanning in the second tube is carried out. This procedure is effective even if the frame frequencies are not coupled. If, on the other hand, the conversion is to be effected from a higher frame frequency to a lower frame frequency, then no switching from the first to the second tube is necessary and actually does not take place in the arrangement according to the invention.

Figure 1B:
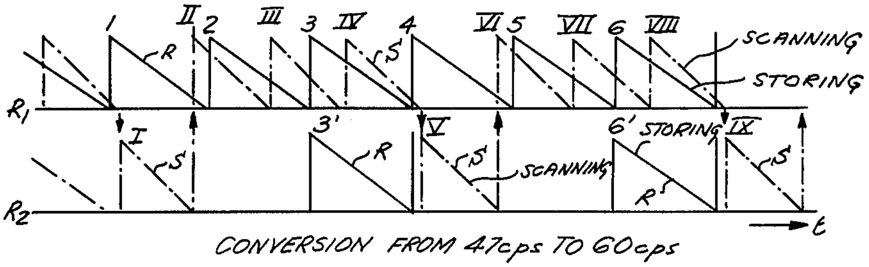
Figure 1C:
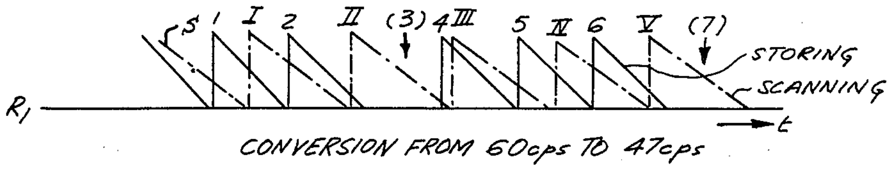
Figure 2:
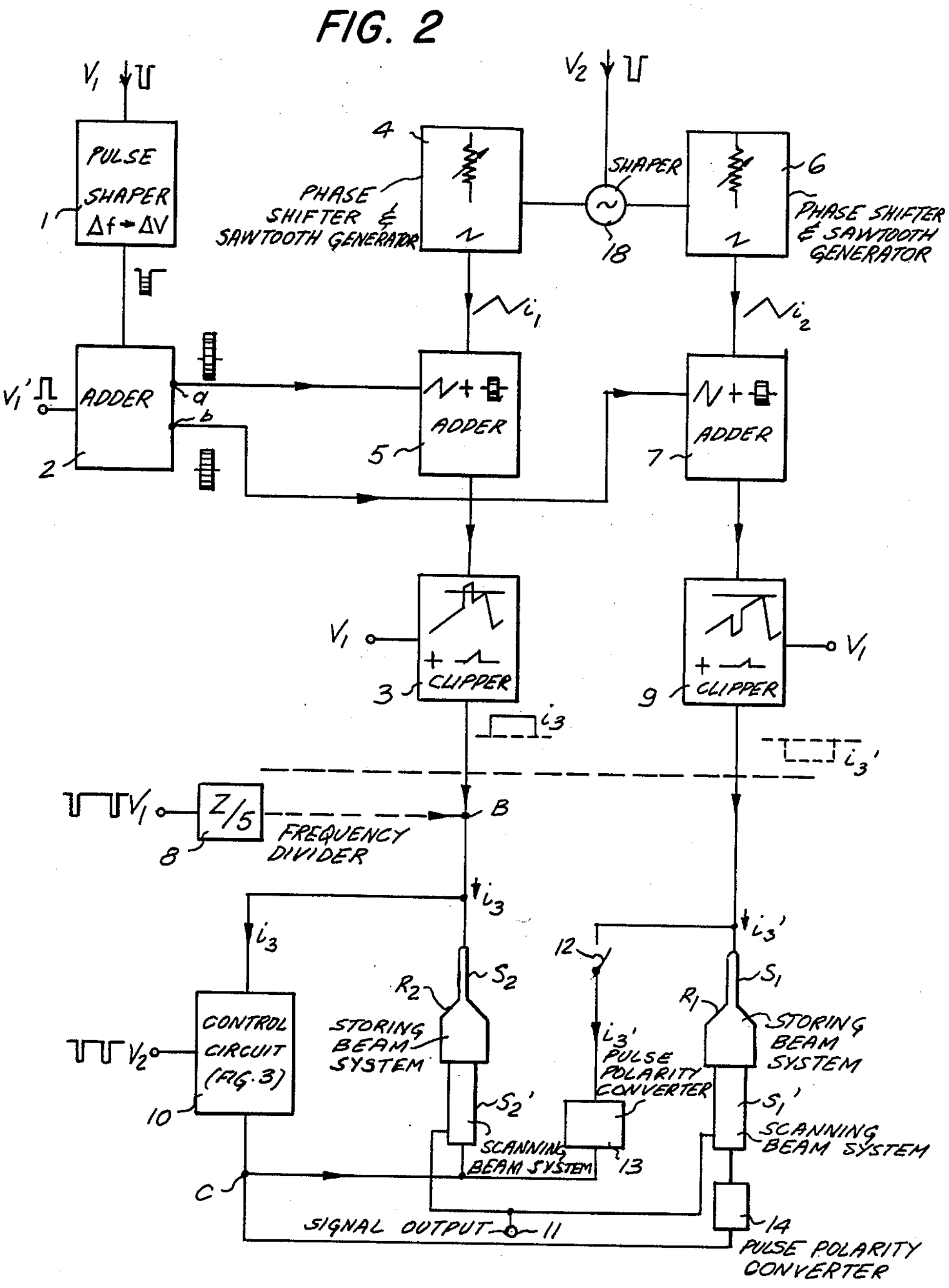
Figure 3:
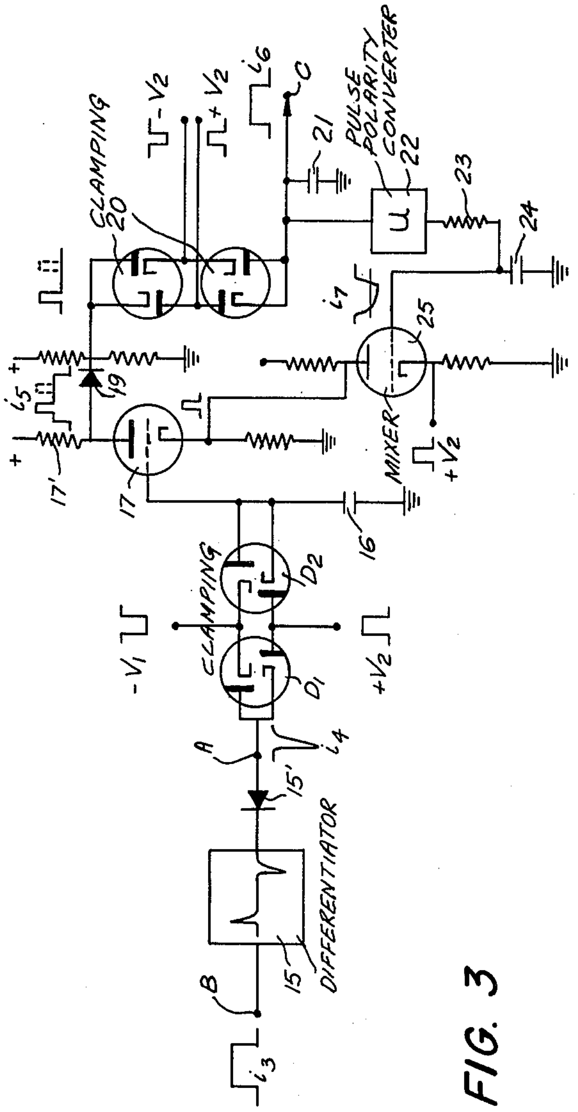

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1*a* is a graph illustrating the storing and scanning procedure in the case where conversion of a frame frequency of 50 c.p.s. to a frame frequency of 60 c.p.s., not coupled with each other, is desired;

FIG. 1*b* is a similar graph illustrating the storing and scanning procedure in the case where a frame frequency of 47 c.p.s. to a frame frequency of 60 c.p.s., not coupled with each other, is desired;

FIG. 1*c* is a similar graph illustrating the storing and scanning procedure in the case where conversion from a frequency of 60 c.p.s. to a frame frequency of 47 c.p.s., not coupled with each other, is desired;

FIG. 2 is a schematic circuit diagram in block form illustrating an arrangement which is universally suited for converting any frame frequency $f_1$ to any other frame frequency $f_2$; and FIG. 3 is a partial circuit diagram illustrating a certain detail of FIG. 2.

The above mentioned drawings will serve to illustrate both the method and the arrangement according to the invention.

FIGS. 1*a*, 1*b* and 1*c* are graphs in which the abscissa is time while the ordinates illustrate the vertical sweep of a storing and of a scanning beam during consecutive frame periods. In all these graphs the indications along line $R_1$ illustrate the storing and scanning procedures in a first two-beam tube $R_1$ while indications along line $R_2$ indicate the storing and scanning operations in the second tube $R_2$. Wherever the scanning operation is transferred from one tube to the other a corresponding arrow is applied. The full lines R illustrate the storing beam action while the dash-dotted lines S illustrate the scanning beam action.

The diagram of FIG. 1*a* applies to the condition 2 of above list in which case conversion from a frame frequency of 50 c.p.s. to a frame frequency of 60 c.p.s., coupled with each other, is to be carried out. Every rise and drop of the storing beam illustrated by R corresponds to one frame period. The consecutive frame periods of the storing beam are marked 1, 2, 3, 4, 5 and again 1, 2, 3 in continuation of this sequence. The corresponding scannings (line S) are marked I, II, III, IV, V and VI. As can be seen from the diagram, the storing of the incoming video signal is carried out continuously at a frame frequency of 50 c.p.s. The scanning is carried out at a frame frequency of 60 c.p.s. However, since in the frame period following frame period 5 of the storing beam the sequence of storing and scanning would be reversed under these circumstances, the scanning in the tube $R_1$ is interrupted during this particular frame period, while in the immediately preceding frame period 5 the video signal is stored in the tube $R_2$ at 5' simultaneously and identically with the storing at 5 in tube $R_1$, and the video signal stored at 5' is scanned in the tube $R_2$ in the following frame period as indicated at VI. In other words, during the timely spaced frame periods marked 1 the scanning in tube $R_1$ is interrupted, and only the inbetween sequence of stored video signals in tube $R_1$ is scanned therein. On the other hand, one of the video signals is stored at 5' in the tube $R_2$ during the frame period immediately preceding the frame period during which the stored video signal is not scanned in tube $R_1$, and then, during that same period the signal stored at 5' in the second tube $R_2$ is scanned therein at VI. In this manner six scannings are carried out during a period of time during which only five storings occur in tube $R_1$. It will be shown that the procedure described above can be controlled in comparatively simple manner by means of counting circuits and AND or OR circuits.

The diagram according to FIG. 1*b* corresponds to the condition 4 mentioned above in which case conversion from a frame frequency of 47 c.p.s. to a frame frequency 60 c.p.s., not coupled with each other, is contemplated. In this case circumstances are different inasmuch as the phase of the vertical synchronizing pulses is uncertain and would fluctuate in case of varying input frequencies. While the operation according to FIG. 1*a* is mainly taken care of by the arrangement shown in the lower portion of FIG. 2, the conditions in the case of the procedure according to FIG. 1*b* is taken care of by the arrangement shown in the upper portion of FIG. 2. The procedure according to FIG. 1*b* does not require further description since the reference letters and numerals are applied in the same manner as explained in detail above.

The diagram according to FIG. 1*c* concerns the condition 5 mentioned above according to which a frame frequency of 60 c.p.s. is to be converted to a frame frequency of 47 c.p.s. Again the reference letters and numerals are applied in the same manner as above. It can be seen that in this case the second tube $R_2$ is not used and that the desired effect is obtained alone by cancelling the storing beam during a frame period occurring when a reversal of the sequence of storing and scanning is imminent. This is indicated at (3) and (7).

It should be understood that for instance the procedure according to FIG. 1*a* could be modified without changing the desired effect if the inbetween sequence of storing and scanning between the timely spaced frame periods marked 1 were carried out simultaneously and identically in both tubes $R_1$ and $R_2$, or even partly in one and partly in the other tube because the combination of whatever is stored and scanned in one or the other tube would still appear at the output of the scanning means in the same manner as described in reference to FIG. 1*a*. Thus, a "combined sequence" of stored video signals in tubes $R_1$ and $R_2$ constituting the above mentioned inbetween sequence between the timely spaced stored video signal is to be interpreted both as a combination of no signals during this period in one of the tubes with signals in the other tube, and as a combination of such signals appearing in both of the tubes.

Referring now to FIG. 2, the arrangement comprises two preferably identical two-beam tubes, preferably of the orthicon type, marked $R_1$ and $R_2$, each having a storing beam system $S_1$ and $S_2$, respectively, and a scanning beam system $S_1'$ and $S_2'$, respectively.

First those components of the arrangement will be described which are used in the most common case in which the conversion of a frame frequency $f_1$ into a second frame frequency $f_2$ is to be effected, said frequencies being not coupled with each other and being different from each other. The input signal $V_1$ having negative polarity and the first frequency $f_1$ is introduced into a unit 1 operating in the well known manner of a pulse shaper so as to be converted into a pulse of the same phase but of an amplitude depending upon the particular frequency $f_1$. This resulting pulse as shown is applied to a unit 2 in which it is added to a pulse $V_1'$ being opposite in phase to the pulse $V_1$. This addition of pulses results in a further pulse depending on the frequency and therefore on the amplitude of the counter pulse. This means that in the case where the frequency $f_1$ is equal to the frequency $f_2$ the amplitude of this last mentioned pulse would be 0, however if these frequencies differ, then the amplitude of this last mentioned pulse would be correspondingly either positive or negative. The so produced output pulse is available with one or the other amplitude at the output terminals *a* and *b*, respectively.

The vertical sweep pulse $V_2$ produced locally at the frequency $f_2$ is first converted in a conventional pulse shaper device or the like 18 to sine wave form. However, it is also possible to utilize the locally available alternating current line voltage at its frequency. The sine wave oscillation is applied now to two adjustable phase shifter devices in the units 4 and 6, respectively, so that a phase shift corresponding to the average adjustment range with respect to the maximum possible difference between the frequencies $f_1$ and $f_2$ can be adjusted roughly. The phase shifters may be of usual type, e.g. in form of networks of variable impedances. The sine wave oscillation is transformed in the units 4 and 6 in well known manner into saw tooth pulses $i_1$ and $i_2$, respectively, which are applied to the adder units 5 and 7, respectively, of conventional type. These units 5 and 7 are respectively connected with the output terminals *a* and *b* of the adder unit 2. Consequently, the saw tooth pulses $i_1$ and and $i_2$ are superimposed in the units 5 and 7, respectively, over the positive or negative output pulses furnished by the unit 2.

The output pulses of the units 5 and 7 are applied to the clipper units 3 and 9, respectively. As can be seen from the pulse illustrations within the blocks representing the units 3 and 9, the output pulses from units 5 and 7 differ from each other in that in one case the pulse furnished by unit 2 projects beyond the rising slope of the saw tooth pulse while in the other case the pulse from unit 2 forms a recess in the rising slope of the saw tooth pulse. The clipper circuits in the units 3 and 9 are combined with a switching system whereby at the output of the unit 3 a control pulse $i_3$ is delivered having a polarity ranging between 0 and positive polarity, while at the output of unit 9 a control pulse $i_3'$ is delivered having a polarity ranging between 0 and negative polarity. The pulse $i_3$ is applied to the storing beam system $S_2$ of the tube $R_2$, while the control pulse $i_3'$ is applied to the storing beam system $S_1$ of the tube $R_1$.

This has the effect that in the case of the application of the control pulse $i_3$ to the tube $R_2$ the storing beam system $S_2$ is activated whenever the superimposed pulse from unit 2 projecting from the slope of the saw tooth pulse exceeds the clipping level in unit 3, while the application of the control pulse $i_3'$ to tube $R_1$ results in blocking the storing beam system $S_1$.

The control pulse $i_3$ for instance may be produced by means of a clamping circuit of the type illustrated as a detail of the arrangement shown in FIG. 3. The clamping circuit in question extends between the point A and the condenser 16. The pulse portion projecting, as stated above, above the clipping level in unit 3 is applied to point A. The clamping circuit comprises two double-diodes $D_1$ and $D_2$. The clamping pulses $V_1$ are in phase with the pulses applied at A and when applied to the double-diode clamping arrangement they cause conductivity of the diodes in a well known manner. Whenever the diodes are rendered conductive the condenser 16 receives a charge equal to the potential existing at A.

As stated above, the control pulse $i_3$ applied to the storing beam system $S_2$ of the tube $R_2$ will activate this storing beam system to produce a storing beam only when a video signal is to be stored in this second tube. However, in addition, the control pulse $i_3$ furnished by the unit 3 serves to activate a scanning beam in tube $R_2$ after the just mentioned video signal has been stored in this tube. In order to obtain this effect a control circuit 10 is inserted between the scanning beam system $S_2'$ and the output terminal of the clipper unit 3.

The details of the control circuit 10 are illustrated by FIG. 3. The control pulse $i_3$ appearing at the point B is differentiated by a conventional differentiator 15, and by suppressing the positive peak of the differentiated pulse by means of a rectifier 15' a negative pulse $i_4$ corresponding to the trailing edge of the pulse $i_3$ is obtained. This pulse $i_4$ is applied to the double-diode clamping circuit $D_1$, $D_2$ which is controlled by negative vertical sweep pulses $V_1$ so that, in the manner described above, the condenser 16 is charged to a negative potential for the duration of one period of the pulse $V_1$ whenever a control pulse $i_3$ appears. The negative charge potential of the condenser 16 is applied to the grid of a triode 17 the cathode of which is simultaneously controlled via triode 25 with positive pulses derived from the pulses $V_2$. Consequently, a combined positive rectangular pulse $i_5$ including a superimposed pulse $V_2$ appears at the anode resistor 17' of the tube 17. In the rectifier or series diode clipper 19 the $V_2$ pulse component is separated, and this results in a control pulse $i_6$ at the condenser 21 due to the action of the double diode clamping circuit 20 controlled by the pulse $V_2$ as shown.

Under the assumption that the frequency $f_2$ is higher than the frequency $f_1$ so that the period of the pulse $V_2$ is shorter than the period of $V_1$, it might occur that two pulses $V_2$ appear at the tube 17 during a frame period of $V_1$. This would have the effect that the control pulse $i_6$ appearing at the condenser 21 would have twice its desired duration. In order to avoid this means are provided for suppressing such a second pulse $V_2$. For instance, a saw tooth shaped negative output pulse $i_7$ may be mixed with the pulses $V_2$ applied to the tube 17 in such a manner that the first pulse $V_2$ is still transmitted while it occurs at the beginning of the saw tooth pulse $i_7$, while at the appearance of a second pulse $V_2$ the saw tooth potential is already negative to such a degree that the tube 25 is blocked and no further pulse $V_2$ can be transmitted. Therefore, as shown in FIG. 3, the positive control pulse $i_6$ appearing at the condenser 21 is first reversed in polarity in a conventional converter circuit 22, whereafter it is shaped to a saw tooth pulse $i_7$ by means of the RC-circuit 23, 24, and thereafter the saw tooth pulse $i_7$ is applied to the grid of a mixer tube 25 the cathode of which is controlled by positive $V_2$ pulses. By suitably adjusting the starting potential of this tube 25 the effect is obtained that a second $V_2$ pulse cannot appear at the cathode of the tube 17. As will be readily understood, the circuit arrangement according to FIG. 3 delivers at the point C the control pulse $i_6$ appearing at the condenser 21. As can be seen from FIG. 2, this pulse $i_6$ appearing at the point C reaches the scanning beam system $S_2'$ of the tube $R_2$ so that the video signal just previously stored in the tube $R_2$ is immediately thereafter scanned once by the scanning beam system $S_2'$.

In the case that the frequency $f_1$ is lower than the frequency $f_2$, the tube $R_1$ is supplied by the clipper unit 9 with only one constant pulse potential which is suitable for activating the storing beam system $S_1$ of the tube $R_1$. Consequently, the storing beam system $S_1$ of the tube $R_1$ is continuously in operation. On the other hand, the scanning beam system $S_1$, of the tube $R_1$ is supplied with such pulses which block the scanning beam of the tube $R_1$ whenever the scanning beam system $S_2'$ of the tube $R_2$ is activated. For this purpose a pulse polarity converter 14 is provided which transmits the required blocking pulse from the point C (output of the circuit 10) to the scanning beam system $S_1'$ of the tube $R_1$.

It may be stated here that both scanning beam systems $S_1'$ and $S_2'$ of the tubes $R_1$ and $R_2$ are connected to a common signal output 11 for delivering video signals at the frame frequency $f_2$.

In the case where the frequency $f_1$ is higher than the frequency $f_2$ (see FIG. 1*c*) the conditions prevailing in the two clipper units 3 and 9 furnishing the control pulses $i_3$ and $i_3'$ are reversed. In this case, the clipper unit 3 furnishes not a control pulse for activating the storing beam system $S_2$ of tube $R_2$. This system remains therefore permanently blocked or inactive. On the other hand, the storing beam system $S_1$ of the tube $R_1$ is supplied at the proper moment with a blocking pulse $i_3'$ which suppresses for one frame period the storing of a video signal in tube $R_1$.

In those cases where the frequencies $f_1$ and $f_2$ are coupled with each other, the operation is greatly simplified because suitable control pulses can be formed by frequency division. In this case such control pulses are introduced into the circuit according to FIG. 2 at point B.

For this eventuality the general circuitry of FIG. 2 is supplemented by a frequency divider circuit 8 which may have the characteristics of a well known counting circuit which, for instance in the case of $f_1=50$ c.p.s. and $f_2=60$ c.p.s. counts the pulses received at the frequency $f_1=50$ c.p.s. and releases every fifth of these pulses to actuate the storing beam system $S_2$ in the same manner as was described above regarding the control pulse $i_3$. However, the pulse delivered by the frequency divider 8 is also applied to the control circuit 10 so as to control the scanning beam system $S_2'$, of tube $R_2$. At the same time the pulse delivered by the control circuit 10 is converted to opposite polarity by the pulse polarity converter 14 so as to be applied in this form to the scanning beam system $S_1'$ of the tube $R_1$.

For dealing with the particular case where the frequency $f_1$ is higher than the frequency $f_2$, the closed switch 12 in circuit with another pulse polarity converter 13 is provided and connected as shown in FIG. 2 so that through the action of this by-pass circuit the storing beam system of the tube $R_1$ is temporarily deactivated, e.g. during every sixth frame period when $f_1$ is 60 c.p.s. and $f_2$ is 50 c.p.s. In this case the tube $R_2$ remains inoperative.

It will be understood that the method and arrangement according to the invention is not only suitable for converting the frame frequency of a video signal according to one international standard into a frame frequency of a video signal according to another international standard. It can also be used in special cases where an input video signal and an output video signal have unusual frame frequencies. This is possible due to the flexibility of the system according to the invention and due to the favorable characteristics of two-beam tubes of the orthicon type which permit when desired storing of a video signal for one second and scanning it thereafter without any undesirable effect. It is for instance possible to suppress the normal flicker in a video signal received, by converting the input signal frame frequency of 50 c.p.s. into a frame frequency of 100 c.p.s. Similarly, the frequency band width can be reduced by converting the input frame frequency of 50 c.p.s. to a lower frame frequency of 25 c.p.s.

It should be further understood that while the arrangement according to FIGS. 2 and 3 is universally suited for dealing with all the different conversion conditions mentioned further above, certain portions of the described arrangement may be used and provided individually if only one or only a few of the above mentioned conditions are to be dealt with.

It will be understood that each of the elements described above, or two or more together, may also find a useful application in other types of method and arrangement for converting video signals having one frame frequency into video signals having another frame frequency differing from the types described above.

While the invention has been illustrated and described as embodied in method and arrangement for converting video signals having one frame frequency into video signals having another frame frequency by means of using two two-beam storage tubes of the superorthicon type, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A method of converting video signals having a first frame frequency into video signals having a second frame frequency, comprising the steps of: forming simultaneously two sequences of first stored video signals at said first frame frequency, including timely spaced stored video signals defined by occurring during those individual frame periods in which, in the event of scanning said first stored video signals at said second frame frequency, the sequence of storing and scanning would be reversed, both sequences combined including during the time intervals between any two of said timely spaced stored video signals a combined continuous inbetween sequence of said first stored video signals, only one of said sequences including said timely spaced stored video signals, while the other one of said sequences does not include said timely spaced stored video signals, but always includes one of said first stored video signals in a frame period immediately preceding the frame period of each of said timely spaced stored video signals; scanning at said second frame frequency said combined inbetween sequence of said first stored video signals between any two consecutive ones of said timely spaced video signals, and scanning in said other one of said sequences said first video signals in said frame periods immediately preceding the frame periods of said timely spaced stored video signals, while at the same time omitting the scanning of said timely spaced stored video signals; and combining all the obtained scanned video signals for delivering a sequence of video output signals at said second frame frequency.

2. A method of converting video signals having a first frame frequency into video signals having a second frame frequency, comprising the steps of: forming a sequence of first stored video signals at said first frame frequency; scanning said stored first video signals at said second frame frequency without scanning those stored first video signals which occur during those individual frame periods in which during continuous storing and scanning at said different frame frequencies, respectively, the sequence of storing and scanning would be reversed; separately forming additional stored video signals respectively identical and simultaneous with those first video signals which occur during individual frame periods immediately preceding those frame periods, respectively, during which said first video signals are not scanned; scanning said additional stored video signals within the duration of said frame periods during which said first video signals are not scanned; and combining all the obtained scanned video signals for delivering a sequence of video output signals at said second frame frequency.

3. A method of converting video signals having a first frame frequency into video signals having a second frame frequency, comprising the steps of: applying a sequence of first video signals at a first frame frequency to a first two-beam storage tube for temporarily storing said first video signals therein by means of a storing beam; scanning said first stored video signals by means of a scanning beam in said first storage tube at a second frame frequency; deriving from the operation of said first storage tube a control signal whenever the condition develops during continuous storing and scanning that in a next following frame period the sequence of said storing and scanning beams would be reversed; applying such control signal to a second two-beam storage tube for producing therein for one frame period a storing beam for storing in said second storage tube additionally a second video signal identical and simultaneous with the corresponding one of said first video signals; causing during the next following frame period in said second storage tube scanning of said second video signal stored therein, while simultaneously cutting off said scanning beam in said first storage tube during said last mentioned frame period; and combining the video signals scanned in both said first and second storage tubes for delivering a sequence of video signals at said second frame frequency.

4. In an arrangement for converting video signals having a first frame frequency into video signals having a second frame frequency, in combination, first and second storing means for storing sequences of video signals; operating means utilizing said first and second frame frequencies for forming in said storing means simultaneously two sequences of first stored video signals at said first frame frequency, including timely spaced stored video signals defined by occurring during those individual frame periods in which, in the event of scanning said first stored video signals at said second frame frequency, the sequence of storing and scanning would be reversed, and for forming in both said storing means combined a combined continuous inbetween sequence of said first video signals during the time intervals between any two of said timely spaced stored video signals, and for forming only in said first storing means said timely spaced stored video signals, while forming in said second storing means one of said first stored video signals in a frame period immediately preceding the frame period of each of said timely spaced stored video signals; scanning means for scanning in said storing means at said second frame frequency said combined inbetween sequence of said first video signals between any two consecutive ones of said timely spaced video signals, and for scanning in said second storing means said first video signals in said frame periods immediately preceding the frame periods of said timely spaced stored video signals, while at the same time omitting the scanning of said timely spaced stored video signals in said first storing means; and common video signal output means connected with said scanning means for delivering a sequence of video signals at said second frame frequency.

5. In an arrangement for converting video signals having a first frame frequency into video signals having a second frame frequency, in combination, a first and a second two-beam storage tube means, each having a video signal storing beam system producing a storing beam, and a scanning beam system producing a scanning beam; operating means utilizing said first and second frame frequencies for operating said storing beam system of said first tube means at a first frame frequency and for operating said scanning system of said first tube means at a second frame frequency, said operating means causing, when the condition arises that during continuous storing and scanning in said first tube means the relative sequence of said storing and scanning beams would be reversed during a particular frame period, in said second tube means the production of a storing beam for storing in said second tube means, for one frame period immediately preceding said particular frame period, an additional video signal identical and simultaneous with the corresponding video signal being stored in said first tube means; means for activating said scanning beam system in said second tube means for scanning, within the duration of said particular frame period, said additional video signal stored in said second tube means, and for simultaneously cutting off said scanning beam in said first tube means during said particular frame period; and common video signal output means connected with said scanning beam systems of both said first and second tube means for delivering a sequence of video signals at said second frame frequency.

6. In an arrangement for converting video signals having a first frame frequency into video signals having a second frame frequency, in combination, a first and second two-beam storage tube means, each having a video signal storing beam system producing a storing beam, and a scanning beam system producing a scanning beam; operating means utilizing said first and second frame frequencies for operating said storing beam system of said first tube means at a first frame frequency and for operating said scanning system of said first tube means at a second frame frequency; control means responsive to the condition that during continuous storing and scanning in said first tube means the relative sequence of said storing and scanning beams would be reversed during a particular frame period, said control means responding to such a condition by causing in said second tube means the production of a storing beam for storing in said second tube means, for one frame period immediately preceding said particular frame period, an additional video signal identical and simultaneous with the corresponding video signal being stored in said first tube means; means for activating said scanning beam system in said second tube means for scanning, within the duration of said particular frame period, said additional video signal stored in said second tube means, and for simultaneously cutting off said scanning beam in said first tube means during said particular frame period; and common video signal output means connected with said scanning beam systems of both said first and second tube means for delivering a sequence of video signals at said second frame frequency.

7. In an arrangement for converting video signals having a first frame frequency into video signals having a second frame frequency, in combination, a first and second two-beam storage tube means, each having a video signal storing beam system producing a storing beam, and a scanning beam system producing a scanning beam; operating means utilizing said first and second frame frequencies for operating said storing beam system of said first tube means at said first frame frequency and for operating said scanning beam system of said first tube means at said second frame frequency; means for deriving from said operating means a control signal whenever during continuous storing and scanning in said first tube means at said first and second frame frequencies, respectively, the condition develops that the relative sequence of storing and scanning would be reversed; means for applying said control signal to said storing beam system of said second tube means and for producing thereby for one frame period a storing beam for storing a video signal in said second tube means; means for deriving from said control signal activation of said scanning beam system of said second tube means for scanning, during a second frame period next following said one frame period, said video signal stored in said second tube means, and for simultaneously cutting off said scanning beam in said first tube means during said second frame period; and common video signal output means connected with said scanning beam systems of both said first and second tube means for delivering a sequence of video signals at said second frame frequency.

8. An arrangement according to claim 7, comprising first input means for introducing a sequence of first beam control pulses at said first frame frequency; second input means for introducing a sequence of second beam control pulses at said second frame frequency, said second input means including pulse shaper means for converting said second beam control pulses into saw tooth pulses; adder means connected between said first input means and said pulse shaper means for adding said first beam control pulses to said saw tooth pulses so as to form corresponding combination pulses; clipper means for separating from said combination pulses first and second tube control pulses; and means for applying, at intervals proportional to the prevailing difference between said first and second frame frequencies, said first and second tube control pulses to said storing beam and scanning beam systems of said first and second tube means, respectively, in such a manner that at the end of said intervals said storing beam systems of both said tubes produce a storage beam during one frame period, and that during the next following frame period said scanning beam system of said first tube means is deactivated, and said scaninng beam system of said second tube means is activated.

9. An arrangement according to claim 8, comprising two of said adder means, the first thereof furnishing said combination pulses when said first frame frequency is higher than said second frame frequency, and the second of said adder means furnishing said combination pulses when said second frame frequency is higher than said first frame frequency.

10. An arrangement according to claim 9, wherein adjustable phase shifter means are connected between said second input means and said adder means for adjusting at least roughly the phase position of said saw tooth pulses in accordance with the mean adjustment range with respect to the maximum possible difference between said first and second frame frequencies.

11. An arrangement according to claim 10, wherein said second input means include means for introducing said second beam control pulses in sine wave form.

12. An arrangement according to claim 11, comprising an auxiliary circiut arrangement connecting a junction point between the output of said clipper means and said storage beam system of said second tube means with said scanning beam system of said second tube means, said auxiliary circuit arrangement including: differentiator means for deriving from the trailing edge of said tube control pulses furnished by said clipper means a secondary pulse; clamping circuit means connected with said differentiator means and said first input means for transmitting said secondary pulses under control of said first beam control pulses; condenser means charged by each of said secondary pulses during one respective period of said first beam control pulses; mixer means controlled by said second beam control pulses and connected with said condenser for mixing each condenser discharge with one of said second beam control pulses and furnishing a control pulse for activating said scanning beam system of said second tube means.

13. An arrangement according to claim 8, comprising an auxiliary circuit arrangement connecting a junction point between the output of said clipper means and said storage beam system of said second tube means with said scanning beam system of said second tube means, said auxiliary circuit arrangement including: differentiator means for deriving from the trailing edge of said tube control pulses furnished by said clipper means a secondary pulse; clamping circuit means connected with said differentiator means and said first input means for transmitting said secondary pulses under control of said first beam control pulses; condenser means charged by each of said secondary pulses during one respective period of said first beam control pulses; mixer means controlled by said second beam control pulses and connected with said condenser for mixing each condenser discharge with one of said second beam control pulses and furnishing a control pulse for activating said scanning beam system of said second tube means.

14. An arrangement according to claim 13, comprising a by-pass circuit arrangement connecting the input of said storing beam system of said first tube means with the output of said auxiliary circuit arrangement, said by-pass circuit arrangement including normally open switch means and pulse polarity converter means in series-connection for causing the storing beam of said first tube means to be cut off by a reversed control pulse derived from a control pulse furnished by said auxiliary circuit arrangement upon closing said switch means, as is required for the conversion of one frame frequency into another when said frequencies are coupled with each other.

15. A method of converting video signals having a first frame frequency into video signals having a second frame frequency, comprising the steps of: applying a sequence of first video signals at a first frame frequency to a first two-beam orthicon type tube for temporarily storing said first video signals therein by means of a storing beam; scanning said first stored video signals by means of a scanning beam in said first tube at a second frame frequency; deriving from the operation of said first tube a control signal whenever the condition develops during continuous storing and scanning that in a next following frame period the sequence of said storing and scanning beams would be reversed; applying such control signal to a second two-beam orthicon type tube for producing therein for one frame period a storing beam for storing in said second tube additionally a second video signal identical and simultaneous with the corresponding one of said first video signals; causing during the next following frame period in said second tube scanning of said second video signal stored therein, while simultaneously cutting off said scanning beam in said first tube during said last mentioned frame period; and combining the video signals scanned in both said first and second tubes for delivering a sequence of video signals at said second frame frequency.

16. In an arrangement for converting video signals having a first frame frequency into video signals having a second frame frequency, in combination, a first and second two-beam orthicon type tube means, each having a video signal storing beam system producing a storing beam, and a scanning beam system producing a scanning beam; operating means utilizing said first and second frame frequencies for operating said storing beam system of said first tube means at a first frame frequency and for operating said scanning system of said first tube means at a second frame frequency; control means responsive to the condition that during continuous storing and scanning in said first tube means the relative sequence of said storing and scanning beams would be reversed during a particular frame period, said control means responding to such a condition by causing in said second tube means the production of a storing beam for storing in said second tube means, for one frame period immediately preceding said particular frame period, an additional video signal identical and simultaneous with the corresponding video signal being stored in said first tube means; means for activating said scanning beam system in said second tube means for scanning, within the duration of said particular frame period, said additional video signal stored in said second tube means, and for simultaneously cutting off said scanning beam in said first tube means during said particular frame period; and common video signal output means connected with said scanning beam systems of both said first and second tube means for delivering a sequence of video signals at said second frame frequency.

References Cited by the Examiner

UNITED STATES PATENTS 2,813,148 11/57 Pensak ---------------- 178—6.8

DAVID G. REDINBAUGH, *Primary Examiner.*

ROY LAKE, *Examiner.*